(12) United States Patent
Chun et al.

(10) Patent No.: US 8,160,012 B2
(45) Date of Patent: Apr. 17, 2012

(54) METHODS OF SETTING UP CHANNEL IN WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 12/452,464

(22) PCT Filed: Aug. 11, 2008

(86) PCT No.: PCT/KR2008/004673
§ 371 (c)(1),
(2), (4) Date: Dec. 31, 2009

(87) PCT Pub. No.: WO2009/022840
PCT Pub. Date: Feb. 19, 2009

(65) Prior Publication Data
US 2010/0142457 A1    Jun. 10, 2010

Related U.S. Application Data

(60) Provisional application No. 60/955,040, filed on Aug. 10, 2007.

(30) Foreign Application Priority Data

Aug. 11, 2008    (KR) .......................... 10-2008-0078645

(51) Int. Cl.
*H04W 4/00* (2009.01)
(52) U.S. Cl. ........................................................ 370/329
(58) Field of Classification Search .................. 370/329
See application file for complete search history.

(56) References Cited

U.S. PATENT DOCUMENTS

| 5,878,041 | A  | 3/1999 | Yamanaka et al. |
| 6,445,917 | B1 | 9/2002 | Bark et al. |
| 6,594,240 | B1 | 7/2003 | Chuah et al. |
| 6,728,918 | B1 | 4/2004 | Ikeda et al. |

(Continued)

FOREIGN PATENT DOCUMENTS

CN    1613210    5/2005
(Continued)

OTHER PUBLICATIONS

Nokia: "Buffer reporting for E-UTRAN", vol. R2-060829, pp. 1-5, XP002503218, 3GPP TSG-RAN WG2 Meeting #62, Athens, Greece. Mar. 27-31, 2006.

(Continued)

*Primary Examiner* — Gary Mui
*Assistant Examiner* — Richard K Chang
(74) *Attorney, Agent, or Firm* — McKenna Long & Aldridge LLP

(57) ABSTRACT

A method of establishing a channel in a wireless communication system is disclosed. The method of establishing a dedicated channel of a user equipment in a wireless communication system includes, receiving channel configuration information which is required for establishing the dedicated channel from a network, transmitting a first status report to the network if at least one first condition is satisfied, and establishing the dedicated channel using the channel configuration information after transmitting the first status report. As a result, the wireless communication system can increase its scheduling efficiency using buffer status information of the UE.

17 Claims, 5 Drawing Sheets

U.S. PATENT DOCUMENTS

| | | |
|---|---|---|
| 6,738,624 B1 | 5/2004 | Aksentijevic et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,706,410 B2 | 4/2010 | Chun et al. |
| 7,710,930 B2 | 5/2010 | Kwak |
| 7,817,595 B2 | 10/2010 | Wu |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0022213 A1 | 2/2004 | Choi et al. |
| 2004/0076182 A1 | 4/2004 | Wu |
| 2004/0103435 A1 | 5/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2005/0020260 A1 | 1/2005 | Jeong et al. |
| 2005/0039101 A1 | 2/2005 | Torsner |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen |
| 2005/0094596 A1 | 5/2005 | Pietraski et al. |
| 2005/0096017 A1 | 5/2005 | Kim |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0193309 A1 | 9/2005 | Grilli et al. |
| 2005/0201354 A1 | 9/2005 | Hosaka et al. |
| 2005/0237932 A1* | 10/2005 | Liu ............................... 370/230 |
| 2005/0238051 A1 | 10/2005 | Yi et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0072494 A1 | 4/2006 | Matusz |
| 2006/0072503 A1 | 4/2006 | Kim et al. |
| 2006/0080145 A1 | 4/2006 | Cook et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1* | 6/2006 | Mueckenheim et al. ..... 455/453 |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov |
| 2007/0189205 A1* | 8/2007 | Terry et al. ................... 370/328 |
| 2007/0201397 A1 | 8/2007 | Zhang |
| 2007/0268861 A1 | 11/2007 | Diachina et al. |
| 2007/0274278 A1 | 11/2007 | Choi et al. |
| 2008/0008152 A1 | 1/2008 | Lohr et al. |
| 2008/0051098 A1 | 2/2008 | Rao |
| 2008/0069108 A1 | 3/2008 | Yi et al. |
| 2008/0089285 A1 | 4/2008 | Pirskanen et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0198869 A1 | 8/2008 | Jiang |
| 2008/0268878 A1 | 10/2008 | Wang et al. |
| 2008/0310395 A1 | 12/2008 | Kashima |
| 2008/0318578 A1* | 12/2008 | Worrall ........................ 455/437 |
| 2009/0005058 A1 | 1/2009 | Kazmi et al. |
| 2009/0016301 A1 | 1/2009 | Sammour et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0175163 A1 | 7/2009 | Sammour et al. |
| 2009/0175253 A1 | 7/2009 | Wu et al. |
| 2009/0259908 A1 | 10/2009 | Gollapudi |
| 2010/0014466 A1 | 1/2010 | Meyer et al. |
| 2011/0033048 A1 | 2/2011 | Stanwood et al. |

FOREIGN PATENT DOCUMENTS

| | | |
|---|---|---|
| EP | 1326397 | 7/2003 |
| EP | 1 343 267 | 9/2003 |
| EP | 1 508 992 | 2/2005 |
| EP | 1 689 130 | 8/2006 |
| EP | 1 695 462 A1 | 8/2006 |
| EP | 1 746 855 | 1/2007 |
| EP | 1 768 297 | 3/2007 |
| EP | 1 796 405 | 6/2007 |
| JP | 07-162948 | 6/1995 |
| JP | 2001-197021 | 7/2001 |
| JP | 2002-198895 A | 7/2002 |
| JP | 2003-229925 | 8/2003 |
| JP | 2006-505209 | 2/2006 |
| JP | 2007-116639 | 5/2007 |
| JP | 2009-513058 | 3/2009 |
| JP | 2009-521893 | 6/2009 |
| KR | 10-2001-0045783 | 6/2001 |
| KR | 10-2001-0062306 | 7/2001 |
| KR | 10-2002-0004645 | 1/2002 |
| KR | 10-2002-0097304 | 12/2002 |
| KR | 10-2003-0012048 | 2/2003 |
| KR | 10-2003-0060055 | 7/2003 |
| KR | 10-2003-0068743 | 8/2003 |
| KR | 10-2003-0087914 A | 11/2003 |
| KR | 10-2004-0034398 | 4/2004 |
| KR | 10-2004-0039944 | 5/2004 |
| KR | 10-2004-0072961 | 8/2004 |
| KR | 10-2005-0022988 | 3/2005 |
| KR | 10-2005-0062359 | 6/2005 |
| KR | 10-2005-0081836 | 8/2005 |
| KR | 10-2005-0099472 | 9/2005 |
| KR | 10-2005-0099472 | 10/2005 |
| KR | 10-2005-0100882 | 10/2005 |
| KR | 10-2005-0103127 A | 10/2005 |
| KR | 10-2006-0004935 | 1/2006 |
| KR | 10-2006-0014910 | 2/2006 |
| KR | 10-2006-0029452 A | 4/2006 |
| KR | 10-2006-0042858 | 5/2006 |
| KR | 10-2006-0069378 | 6/2006 |
| KR | 10-2006-0079784 | 7/2006 |
| KR | 10-2006-0090191 | 8/2006 |
| KR | 10-2006-0134058 | 12/2006 |
| KR | 10-2007-0048552 | 5/2007 |
| KR | 10-2007-0076374 A | 7/2007 |
| RU | 2291594 C2 | 1/2007 |
| RU | 2304348 | 8/2007 |

| | | |
|---|---|---|
| TW | 496058 | 7/2002 |
| WO | WO 01/37473 | 5/2001 |
| WO | WO 03/045103 | 5/2003 |
| WO | WO 2004/042953 A1 | 5/2004 |
| WO | WO 2004/042963 | 5/2004 |
| WO | WO 2005/039108 | 4/2005 |
| WO | WO 2005/122441 A1 | 12/2005 |
| WO | WO 2005/125226 | 12/2005 |
| WO | WO 2006/009714 | 1/2006 |
| WO | WO 2006/046894 | 5/2006 |
| WO | WO 2006/052086 | 5/2006 |
| WO | WO 2006/083149 | 8/2006 |
| WO | WO 2006/118418 | 11/2006 |
| WO | WO 2007/020070 | 2/2007 |
| WO | WO 2007/024065 | 3/2007 |
| WO | WO 2007/039023 | 4/2007 |
| WO | WO 2007/045505 | 4/2007 |
| WO | WO 2007/052900 | 5/2007 |
| WO | WO 2007/052921 | 5/2007 |
| WO | WO 2007/066900 | 6/2007 |
| WO | WO 2007/078142 | 7/2007 |
| WO | WO 2007/078155 A2 | 7/2007 |
| WO | WO 2007/078164 | 7/2007 |
| WO | WO 2007/078173 | 7/2007 |
| WO | WO 2007/078174 A1 | 7/2007 |
| WO | WO 2007/079085 | 7/2007 |
| WO | WO 2007/089797 | 8/2007 |
| WO | WO 2007/126793 | 11/2007 |
| WO | WO 2007-078174 A1 | 12/2007 |
| WO | WO 2007/147431 | 12/2007 |
| WO | WO 2008/004725 A1 | 1/2008 |
| WO | WO 2008/010063 | 1/2008 |

OTHER PUBLICATIONS

Nokia: "Uplink Scheduling for VoIP", No. R2-070476, Feb. 12-16, 2007, pp. 1-15, XP008125208, 3GPP TSG-RAN WG2 Meeting #57, St. Louis, Missouri.

Ghosh, A. et al.; "Random Access Design for UMTS Air-Interface Evolution"; Vehicular Technology Conference, 2007. VTC2007-Spring IEEE 65th; Apr. 22-25, 2007; pp. 1041-1045.

Sadayuki Abeta et al., "Super 3G Technology Trends. Part 2: Research on Super 3G Technology", NTT DoCoMo Technical Journal, vol. 8, No. 3, pp. 55-62, Dec. 2006, See Section 3; Figure 5.

Nokia, "System Information Distribution", 3GPP TSG-RAN WG2 Ad Hoc Meeting on LTE, R2-061487, Cannes, France, pp. 1-3, Jun. 27-30, 006, See Section 2.

LG Electronics, "Delivery of LTE System Information", 3GPP TSG-RAN WG2 Ad Hoc on LTE, R2-061959, Cannes, France, pp. 1-4, Jun. 27-30, 2006, See Section 3.

NEC: "Optimised buffer status reporting" 3GPP TSG-RAN WG2#58BIS Meeting, Orlando USA, Jun. 25-29, 2007; 20070625, vol. R2-072515 (Jun. 20, 2007), pp. 1-6, XP002503220.

Catt, Ritt: "Consideration on UL buffer reporting" 3GPP TSG-RAN WG2 #55, R2-062934 (Oct. 9, 2006), pp. 1-3, XP002513924 ISSN: 9 URL:http://www.3gpp.org/ftp/tsg_ran/WG2_RL2/TSGR2_55/Documents/.

R2-074691; Ericsson, Nokia Corporation, Nokia Siemens Networks, Qualcomm Europe, Samsung, NTT DoCoMo, Inc. "Framework for Scheduling Request and Buffer Status reporting", Nov. 5-9, 2007, TSG-RAN WG2 Meeting #60.

R1-063046; Motolola, "Syncronized Random Access Channel and Scheduling Request", Nov. 6-10, 2006, 3GPP TSG RAN1 #47.

R2-062350; Ericsson, "Basic Principles for the Scheduling Request in LTE", Aug. 28-Sep. 1, 2006, 3GPP TSG RAN WG2 #54.

R1-063301; NTT DoCoMo, Fujitsu, Mitsubishi Electric, NEC, Sharp, Toshiba Corporation, "Scheduling Request Transmission Method for E-UTRA Uplink", Nov. 6-10, 2006, 3GPP TSG RAN WG1 Meeting #47.

LG Electronics Inc. "Correction of status report coding", 3GPP TSG RAN WG2 #61, Feb. 11-15, 2008, Sorrento, Italy, XP-002624626.

$3^{rd}$ Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.

Alcatel-Lucent: "PDCP status report carrying LIS only", 3GPP TSG RAN WG2 #61, Jan. 14-18, 2008, Sevilla, Spain, XP-50138711.

Qualcomm Europe: "Further Details on RACH Procedure", 3GPP TSG-RAN WG1 #48, Feb. 12-16, 2007, St. Louis, Missouri, R1-070649.

NTT DoCoMo, Inc. "Buffer Status Report and Scheduling Request triggers", 3GPP TSG RAN WG2 #59, Aug. 20-24, 2007, Athens, Greece, R2-072574.

"Correction to PDCP Status Report", 3GPP TSG RAN WG2 #61 bis, Mar. 24, 2008, R2-081594, XP-002624627.

Wang et al., U.S. Appl. No. 60/976,139, filed Sep. 28, 2007, Operation of Control Protocol Data Units in Packet Data Convergence Protocol.

Sammour et al., U.S. Appl. No. 61/019,058, filed Jan. 4, 2008, Method and Apparatus of Performing Packet Data Convergence Protocol Reset.

ZTE: "Redundant retransmission restraint in RLC-AM" 3GPP Draft R2-061234, May 3, 2006, XP050131180.

"Digital Cellular telecommunications system (Phase 2+); Functional stage 2 description of Location Services (LSC) in GERAN (3GPP TS 43.059 version 7.3.0 Release 7); ETSI TS 143 059", May 1, 2007, XP014038519.

LG Electronics Inc: "UE State Transition in LTE_ACTIVE", 3 GPP TSG-RAN WG2 #52; Athens, Greece; Mar. 2006.

Texas Instruments: "UL Synchronization Management and Maintenance in E-UTRA"; Kobe, Japan; May 2007.

Texas Instruments: "UL Synchronization Management in LTE_ACTIVE"; St. Julians, Malta; Mar. 2007.

Motorola: "Contention-Free INTRA-LTE Handover"; St. Louis, USA; Feb. 2007.

Ericsson: "Scheduling Request in E-UTRAN"; Sorrento, Italy; Jan. 2007.

3GPP TS 36.322, V8.0.0, Dec. 2007, $3^{rd}$ Generation Partnership Project; Technical Specification Group Radio Access Network; Evolved Universal Terrestrial Radio Access (E-UTRA) Radio Link Control (RLC) protocol specification (Release 8).

Change Request, Miscellaneous corrections to TS 36.322, 3GPP TSG-RAN2 Meeting #61, Shenzhen, China, Mar. 31-Apr. 4, 2008, R2-081700.

Ericsson: "Clarification to the handling of large RLC status reports", Change Request, 3GPP TSG-RAN2 Meeting #61bis, Shenzhen, China, Mar. 31-Apr. 4, 2008, R2-082018.

LG Electronics et al. "ACK_SN setting for short Status PDU", 3GPP TSG-RAN WG2 #62, May 5-9, 2008, Kansas City, Missouri, R2-082133.

Reuven Cohen: "An Improved SSCOP-like Scheme for Avoiding Unnecessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.

QUALCOMM Europe, "Scheduling request mechanism", 3GPP TSG-RAN WG1 #48bis, 2007 Mar. 30, St. Julian, Malta, R1-071276.

Texas Instruments, "Scheduling Request and DRX in E-UTRA", 3GPP TSG RAN WG1 #49bis, Jun. 29, 2007 Orlando, Florida, R1-072859.

Nokia Siemens Networks "Update on Security, System Information, Mobility, MAMS and DRX", 3GPP TSG-RAN2 Meeting #59, Aug. 31, 2007, Athens, Greece, R2-073863.

Ericsson "SDU Discard", 3GPP TSG-RAN #59, Aug. 20-24, 2007, Athens, Greece, R2- 073230.

3GPP TS 36.321 "E-UTRA MAC protocol specification (Release 8)", 3GPP TS 36.321 v1.0.0, 2007-09 RP-070689.

Motorola "MAC Header Format", 3GPP TSG-RAN2 Meeting #59bis, Shanghai, China, Oct. 8-12, 2007, R2-0074419.

NTT DoCoMo Inc et al. "MAC PDU structure for LTE", 3GPP TSG RAN WG2 #59bis, Oct. 8-12, 2007, Shanghai, China, R2-074174.

"LTE User Plane session report", 3GPP TSG RAN WG2 #59bis, Shanghai, China, Oct. 8-12, 2008, R2-074536.

3GPP TS 25.321 "Medium Access Control protocol specification (Release 7)", 3GPP TS25.321 v7.5.0, 2007-06.

* cited by examiner

METHODS OF SETTING UP CHANNEL IN WIRELESS COMMUNICATION SYSTEM

This application claims priority to International Application No. PCT/KR2008/004673, filed on Aug. 11, 2008 which claims priority to U.S. Provisional Application No. 60/955,040 filed Aug. 10, 2007 and Korean Patent Application No. 10-2008-0078645, filed Aug. 11, 2008, all of which are incorporated by reference for all purposes as if fully set forth herein.

TECHNICAL FIELD

The present invention relates to a method for establishing a channel in a wireless communication system, and more particularly to a method for establishing a channel dedicated for a user equipment (UE) in a wireless communication system.

BACKGROUND ART

FIG. 1 is a structural diagram illustrating a network structure of an Evolved Universal Mobile Telecommunications System (E-UMTS) which is called a fourth-generation mobile communication system. The E-UMTS system is developed from a conventional UMTS system, and conducts intensive research into a basic standardization process in the current 3GPP. The E-UMTS system may also be called a Long Term Evolution (LTE) system.

The E-UMTS network is classified into an Evolved UTRAN (E-UTRAN) and an Evolved Packet Core (EPC). The E-UMTS includes a user equipment (UE), an eNode-B and an Access Gateway (AG) which is located at the end of a network and connected to an external network. The AG may be called as a Mobility Management Entity (MME)/User Plane Entity (UPE). The AG may be divided into a first AG part for taking charge of user traffic and a second AG part for taking charge of control traffic. In this case, a new interface may be located between the first AG part for processing the user traffic and the second AG part for processing the control traffic, such that the first AG part may communicate with the second AG part. A single eNode-B may include at least one cell. An interface for transmitting either the user traffic or the control traffic may be used between the eNode-Bs. The EPC may include an AG and a node for user registration of UEs. An interface for distinguishing the E-UTRAN from the EPC may also be used. The eNode-Bs and the AG may be connected via an S1 interface. In this case, the several nodes are interconnected (i.e., Many to Many Connection). The eNode-Bs may be connected to each other via an X2 interface, and have a meshed network structure with the X2 interface.

Radio protocol layers between the user equipment (UE) and the network are classified into a first layer (L1), a second layer (L2), and a third layer (L3) based on an Open System Interconnection (OSI) reference model well known to a communication system. A physical layer, the first layer (L1), provides an information transfer service using a physical channel. A radio resource control (RRC) layer located in a third layer controls radio resources between the UE and the network. For this operation, the RRC message is exchanged between the UE and the network. The RRC layer is located at the eNode-B in the E-UTRAN.

FIG. 2 is a structural diagram illustrating a radio protocol layer structure between the UE and the E-UTRAN (Evolved-UMTS Terrestrial Radio Access Network) on the basis of the 3GPP radio access network standard specification of the third-generation mobile communication standardization organization. The radio protocol layer structure of FIG. 2 horizontally includes a physical layer, a data link layer, and a network layer. The radio protocol layer structure of FIG. 2 vertically includes a user plane for transmitting data and a control plane for transmitting a control signal (i.e., signaling information). The radio protocol layers of FIG. 2 are classified into a first layer (L1), a second layer (L2), and a third layer (L3) based on an Open System Interconnection (OSI) reference model well known to a communication system.

The control plane and the user plane in the radio protocol layer structure of FIG. 2 will hereinafter be described. The first layer (L1) is a physical layer. The physical layer provides an upper layer with an information transfer service through a physical channel. The physical layer is connected to a medium access control (MAC) layer located at a higher level through a transport channel. Data is transferred between the MAC layer and the physical layer via the transport channel. Data is transferred between different physical layers through a physical channel. Between different physical layers, namely, between physical layers of a transmission side and a reception side, data is transferred via the physical channel.

The medium access control (MAC) layer of the second layer provides services to a radio link control (RLC) layer located at a higher level through a logical channel. The RLC layer supports the transmission of data with reliability. It should be noted that the RLC layer illustrated in FIG. 2 is depicted because if the RLC functions are implemented in and performed by the MAC layer, the RLC layer itself is not required. The PDCP layer of the second layer (L2) performs a header compression function for reducing the IP packet header size including relatively large- and unnecessary-control information, such that it can effectively transmit IP packet (such as IPv4 or IPv6) within a narrow-bandwidth RF interval. The PDCP layer of the E-UTRAN may be located at the AG.

A Radio Resource Control (RRC) layer located at the lowest portion of the third layer is only defined in the control plane. The RRC layer is associated with configuration, re-configuration, and release of a radio bearer (RB), such that it controls logical channels, transport channels, and physical channels. In this case, the radio bearer (RB) signifies a service provided by the second layer for data communication between the UE and the E-UTRAN.

The unit of data transferred to each layer of the radio protocol layer structure is called different names. This data unit is called a service data unit (SDU). A basic unit for allowing a protocol layer to transfer data to another protocol layer is called a protocol data unit (PDU). Data which is transferred between layers of a radio access protocol structure or between radio access protocol structures signifies a predetermined data block such as the above-mentioned SDU or PDU.

FIG. 3 is a flow chart illustrating a procedure for an RRC connection in the E-UMTS system. In order to establish a call connection between the UE and the E-UTRAN system, the UE must establish a RRC connection with the E-UTRAN system, and must also establish a signaling connection with a Core Network (CN). In order to disclose detailed operations of the above RRC connection and the above signaling connection, a RRC state of the UE and the RRC connection procedure will hereinafter be described in detail. The RRC state indicates whether the RRC layer of the UE is logically connected to the RRC layer of the E-UTRAN. If it is determined that the RRC layer of the UE is logically connected to the RRC layer of the E-UTRAN, this state is called a RRC connected state. If the RRC layer of the UE is not logically connected to the RRC layer of the E-UTRAN, this state is called a RRC idle state. A UE in the RRC connected state has a RRC connection with the E-UTRAN, such that the E-UTRAN can recognize the presence of the corresponding UE in a cell. As a result, the UE can be effectively controlled. Otherwise, a UE in the RRC idle state cannot be recognized by the E-UTRAN, but is controlled by a core network (CN) in a tracking area larger than the cell. In other words, only the presence or absence of the above UE in the RRC idle state is recognized in the unit of a large region. If the UE in the RRC idle state desires to receive a mobile communication service such as a voice or data service, the UE must transit to the RRC connection state. Associated detailed description will hereinafter be described in detail.

If a user initially powers on his or her UE, the UE searches for an appropriate cell, and stays in a RRC idle state in the searched cell. The UE staying in the RRC idle state establishes a RRC connection with the RRC layer of the E-UTRAN through a RRC connection procedure when the UE needs to establish the RRC connection, such that the UE transits to the RRC connection state. The UE in the RRC idle state must establish the RRC connection with the E-URTAN due to a variety of reasons. For example, if uplink data transmission is needed due to a user's phone call attempt, or if a paging message is received from the E-UTRAN such that a response message for the paging message must be transmitted, the UE in the RRC idle state needs to connect the RRC connection with the E-URTAN. By means of the RRC connection and the signaling connection, the UE exchanges UE-dedicated control information with the E-UTRAN or CN.

As shown in FIG. 3, according to a first process for the RRC connection establishment, the UE transmits a RRC connection request message to a base station (BS) at step S310. The base station is located at the last end of the E-UTRAN, and wirelessly transmits/receives data to/from the UE. For the convenience of description, the base station to be disclosed in the following description is indicative of the E-UTRAN.

In order to response the RRC connection request message, the base station transmits the RRC connection setup message to the UE at step S320.

The UE transmits the RRC connection setup complete message to the base station at step S330. If the above-mentioned process has been successfully completed, the RRC connection is established between the UE and the base station.

After the RRC connection has been established, the UE initiates a process for establishing the signaling connection by transmitting an initial direct transfer (IDT) message at step S340.

In the meantime, the base station may establish a UE-dedicated physical channel for only one UE. The UE can transmit Layer1/Layer2 (L1/L2) control information to the base station using the above UE-dedicated physical channel. There is a variety of L1/L2 control information, for example, control information to request a scheduling message from the UE to the base station, reference information for the base station to measure a quality of an uplink channel of the UE, downlink channel quality information which the UE reports to the base station, feedback information (e.g., ACK/NACK information) of a Hybrid Automatic Repeat Request (HARQ) scheme, or buffer status information of the UE.

Specifically, the buffer status information of the UE will hereinafter be described in detail. The UE can transmit the buffer status information of the UE as for the L2 control information of the MAC layer to the base station. For this purpose, the buffer status information of the UE may be included in a MAC control element of the MAC PDU which is a data block of the MAC layer of the UE. In this case, the buffer status information of the UE may include information indicating an amount of data stored in the buffer of the UE. The MAC control element including the above buffer status information of the UE forms the MAC PDU along with a MAC header and without the MAC SDU corresponding to payload. So, the MAC control element may be transmitted to the base station, and may be carried on the MAC PDU according to a piggyback scheme and be then transmitted.

According to a representative method for enabling the base station to establish a UE-dedicated physical channel for only one UE, the base station may transmit allocation information of uplink radio resources, which will be allocated at intervals of a predetermined time, to the UE. The above allocation information of uplink radio resources will hereinafter be referred to as periodic radio resource allocation information. The UE can establish the UE-dedicated physical channel using this periodic radio resource allocation information.

In order to establish the UE-dedicated physical channel, a control message for establishing a UE-dedicated physical channel must be transmitted and received between the UE and the base station, such that system overhead occurs and an unexpected delay also occurs in the process for establishing the UE-dedicated physical channel.

DISCLOSURE OF THE INVENTION

Technical Problem

Accordingly, the present invention is directed to a method for establishing a channel in a wireless communication system that substantially obviates one or more problems due to limitations and disadvantages of the related art.

An object of the present invention is to provide a channel configuration method for use in a wireless communication system.

Another object of the present invention is to provide a method for managing uplink radio resources using buffer status information of a UE.

Technical Solution

To achieve these objects and other advantages and in accordance with the purpose of the invention, as embodied and broadly described herein, a method of establishing a dedicated channel of a user equipment in a wireless communication system comprising: receiving channel configuration information which is required for establishing the dedicated channel from a network; transmitting a first status report to the network if at least one first condition is satisfied; and establishing the dedicated channel using the channel configuration information after transmitting the first status report.

In another aspect of the present invention, there is provided a method for controlling configuration of a dedicated channel of a user equipment (UE) in a network of a wireless communication system comprising: transmitting channel configuration information which is required for establishing the dedicated channel to a user equipment (UE); receiving a first status report indicating that at least one first condition is satisfied from the user equipment (UE); and receiving a message transmitted via the established dedicated channel, which is established using the channel configuration information.

The method further comprises: receiving a second status report from the user equipment (UE) if at least one second condition is satisfied; and releasing the dedicated channel after receiving the second status report.

Advantageous Effects

The present invention can improve the scheduling efficiency of a wireless communication system using buffer status information of a UE.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

The following embodiments will disclose a variety of application examples of the present invention, which is applied to the IEEE 802.16e system and the IEEE 802.16m system which serve as the standard specification of not only a single-carrier multiple access system but also a multi-carrier multiple access system (e.g., an OFDM mobile communication system) considering the mobile station (MS) mobility [See IEEE Std 802.16e-2005 and http://www.ieee802.org/16/published.html]. Also, the present invention can also be applied to another mobile communication system such as an Evolved Universal Mobile Telecommunications System (E-UMTS) (also called a Long Term Evolution (LTE)). The present invention may be applied to a variety of communication systems including a single-antenna or multi-antenna system.

Generally, a communication system has been widely used to provide a variety of communication services (e.g., VoIP or packet data). The above-mentioned communication system has been used for a downlink or an uplink. The downlink signifies a communication from an eNode-B to a user equipment (UE). The uplink signifies a communication from the UE to the eNode-B. The eNode-B signifies a fixed node communicating with the UE, and includes a network other than the UE in a communication system including not only a physical layer but also an upper layer. The network or the eNode-B is symmetrical to the user equipment (UE), and it should be noted that the network has the same meaning as the eNode-B. The user equipment (UE) may be fixed or have mobility.

Figure 4:
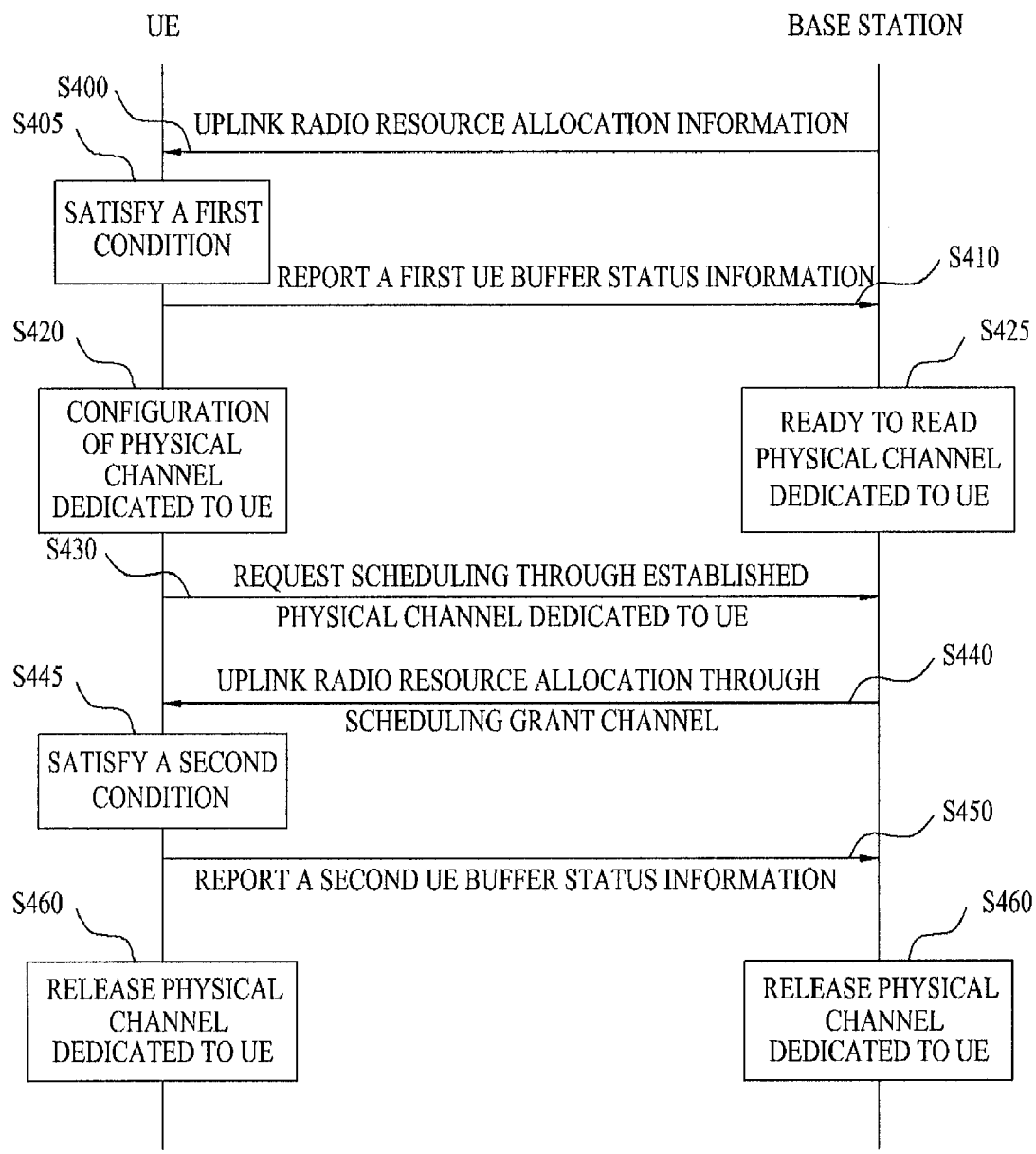
FIG. 4 is a flow chart illustrating a process for establishing/releasing a channel according to one embodiment of the present invention.

FIG. 4 is a flow chart illustrating a process for establishing/releasing a channel according to one embodiment of the present invention. In more detail, FIG. 4 shows a method for allowing the UE to establish a dedicated channel of the UE such that the UE can generate a scheduling request using the dedicated channel.

Referring to FIG. 4, the base station transmits uplink radio resource allocation information to the UE at step S400. This uplink radio resource allocation information may be periodically transmitted as necessary.

Figure 1:
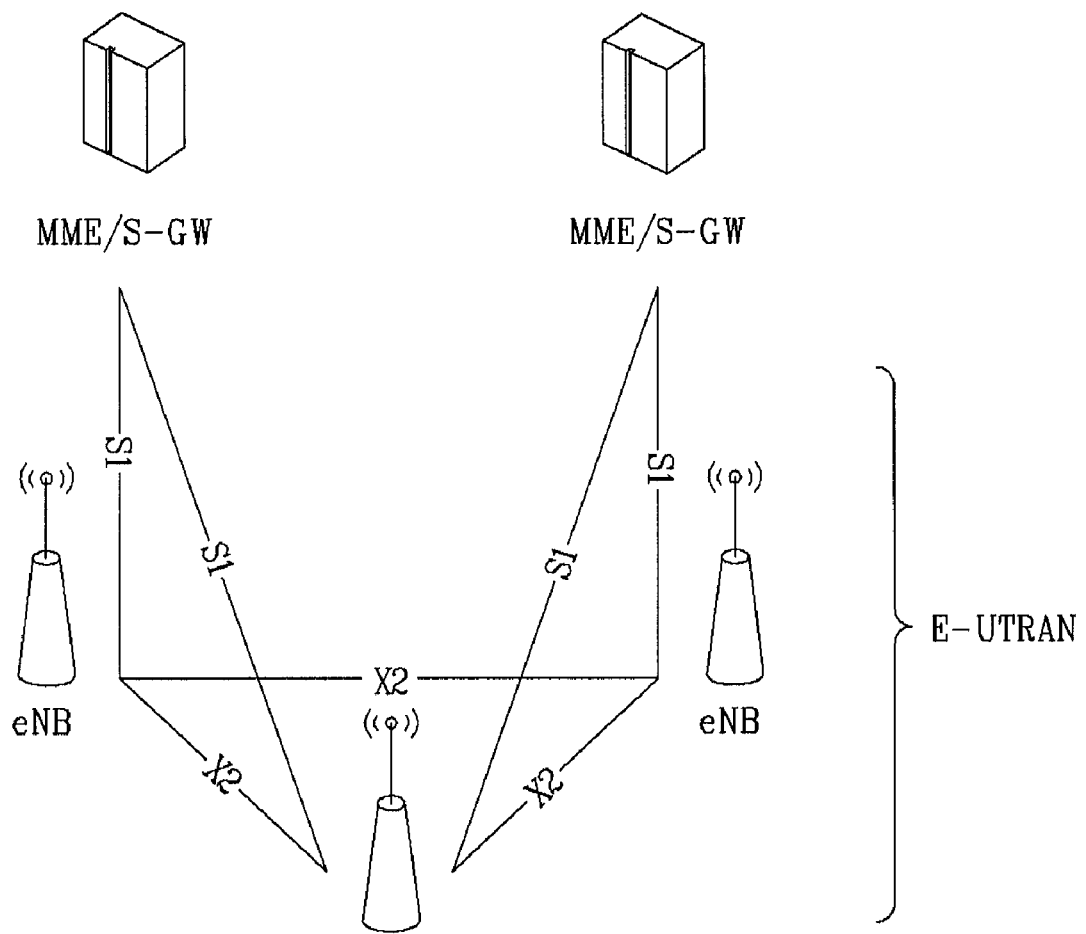
FIG. 1 is a structural diagram illustrating a network structure of an Evolved Universal Mobile Telecommunication System (E-UMTS) which is called a fourth-generation mobile communication system.
Figure 2:
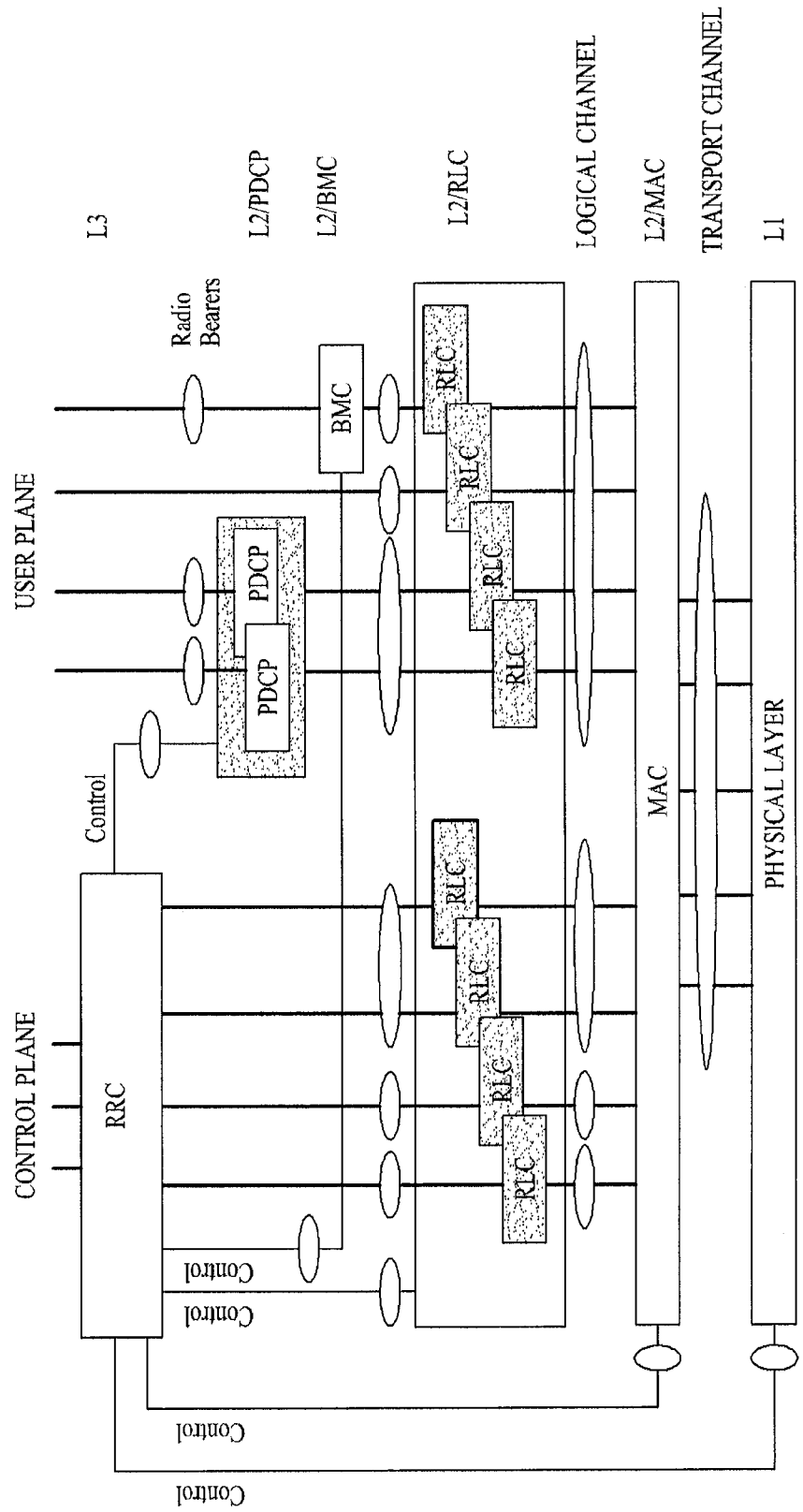
FIG. 2 is a structural diagram illustrating a radio protocol layer structure between the UE and the E-UTRAN (Evolved-UMTS Terrestrial Radio Access Network) on the basis of the 3GPP radio access network specification of the third-generation mobile communication standardization organization.
Figure 3:
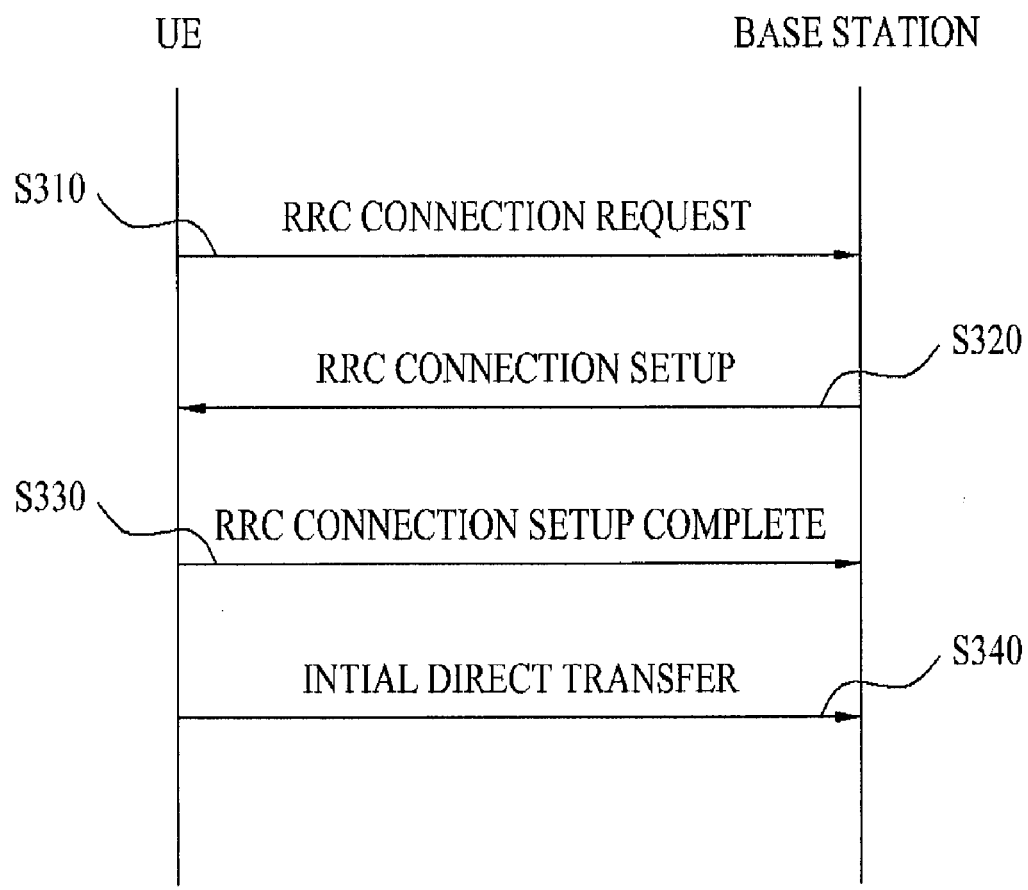
FIG. 3 is a flow chart illustrating an RRC connection procedure in an E-UMTS system.

The UE can periodically report its own buffer status (hereinafter referred to as UE buffer status) to the base station using the above uplink radio resource allocation information. The base station can determine whether uplink resources are allocated to the UE using the UE buffer status information, and/or can determine an amount of allocating resources such that it is able to recognize how much resources should be allocated to the UE. A multi-carrier wireless communication system such as an LTE system allocates resource blocks based on predetermined time- and frequency-units for an uplink of a specific UE, such that the base station is able to use the UE buffer status information transmitted from the UE such that the base station can decide the necessity of allocating uplink resources to the specific UE. In this case, in order to enable the UE to transmit its own buffer status information according to the conventional art, the dedicated physical channel of the UE for transmitting the UE buffer status information must be established. For this operation, it should be noted that the method for transmitting and receiving the RRC message of FIG. 3 is needed, as previously stated above.

In order to allow the UE to report the UE buffer status to the base station, the UE pre-negotiates with the base station about a specific condition of the UE buffer status. Only when this specific condition is satisfied, it is able to report the UE buffer status to the base station. There are two specific conditions of the UE buffer status pre-negotiated with the base station, i.e., a first condition associated with the configuration of the dedicated physical channel, and a second condition associated with the release of the dedicated physical channel of the UE.

In an example of the first condition, if the UE-buffer size (i.e. the amount of data stored in UE buffer) is 0 or is less than a specific threshold value, or if voice data in a voice communication such as a VoIP is temporarily stopped (e.g., transition from talk spurt to silence period), the first condition can be satisfied.

In an example of the second condition, if the UE-buffer size (i.e. the amount of data stored in UE buffer) is not equal to 0 or is greater than a specific threshold value, or if voice data temporarily stopped in a voice communication such as a VoIP is retransmitted (e.g., transition from silence period to talk spurt), the second condition can be satisfied. The above-mentioned threshold value may be transmitted from the base station to the UE through the RRC or MAC message.

FIG. 4 shows an embodiment in which the UE transmits UE buffer status information to the base station only when the buffer status of the UE satisfies a specific condition. Referring to FIG. 4, if the UE buffer status satisfies the first condition at step S405, the UE transmits the UE buffer status information to the base station at step S410, in order to report the satisfaction of the first condition to the base station. This operation may be called a first UE buffer status report.

The UE is able to use the HARQ retransmission scheme during the first UE buffer status report. In other words, the UE can transmit the first UE buffer status report until receiving acknowledgement information from the base station in association with the first UE buffer status report.

If the UE receives a positive acknowledgement message indicating the reception of the first UE buffer status report from the base station, the UE establishes the dedicated physical channel of the UE using uplink resource allocation information received from the base station at the above step S400, at step S420. Likewise, the base station having received the first UE buffer status report gets ready to receive the dedicated physical channel at step S425.

The UE can request the scheduling from the base station through the dedicated physical channel at step S430. In this case, the dedicated physical channel may be called a physical scheduling request channel. The base station can periodically allocate uplink radio resources for this physical scheduling request channel. In other words, in case of using the scheme of reporting the UE buffer status by deciding whether a predetermined condition is satisfied, the base station implicitly pre-allocates uplink resources of the dedicated physical channel of the UE at intervals of a predetermined time, such that the UE can transmit the dedicated physical channel (i.e., the physical scheduling request channel). Also, the UE implicitly allocates the UE-dedicated physical channel. The term "implicit allocation" is as follows. If the UE needs to allocate uplink resources for uplink transmission on the condition that the base station pre-allocates uplink resources although the UE does not actually request allocation of uplink resources, the UE conducts uplink transmission using pre-allocated uplink resources without using the process of exchanging signals with the base station to allocate additional uplink resources.

Thereafter, if the UE buffer status satisfies the first condition, the UE requests the scheduling from the base station via the dedicated physical channel (i.e., a physical scheduling request channel).

If the base station receives the dedicated physical channel (i.e., the physical scheduling request channel), the base station can allocate uplink resources to the UE through a scheduling grant channel at step S440.

Then, if the UE satisfies the second condition at step S445, it transmits UE buffer status information to the base station such that the base station can recognize the satisfaction of the second condition at step S450. For the convenience of description, this operation is called a second UE buffer status report.

In the same manner as in the first UE status report, if the UE receives a positive acknowledgement message indicating the reception of the second UE buffer status report from the base station, it releases the established dedicated physical channel at step S460. For this operation, if the base station receives the second UE buffer status report, it stops receiving the dedicated physical channel.

For another method for allowing the UE to report the UE buffer status to the base station, the UE buffer status information is included in the MAC PDU when the UE transmits an uplink shared channel, such that the UE buffer status information can be transmitted. This MAC PDU may be a control PDU. The above-mentioned uplink shared channel may be an UL-SCH for transmitting user traffic or control information.

Figure 5:
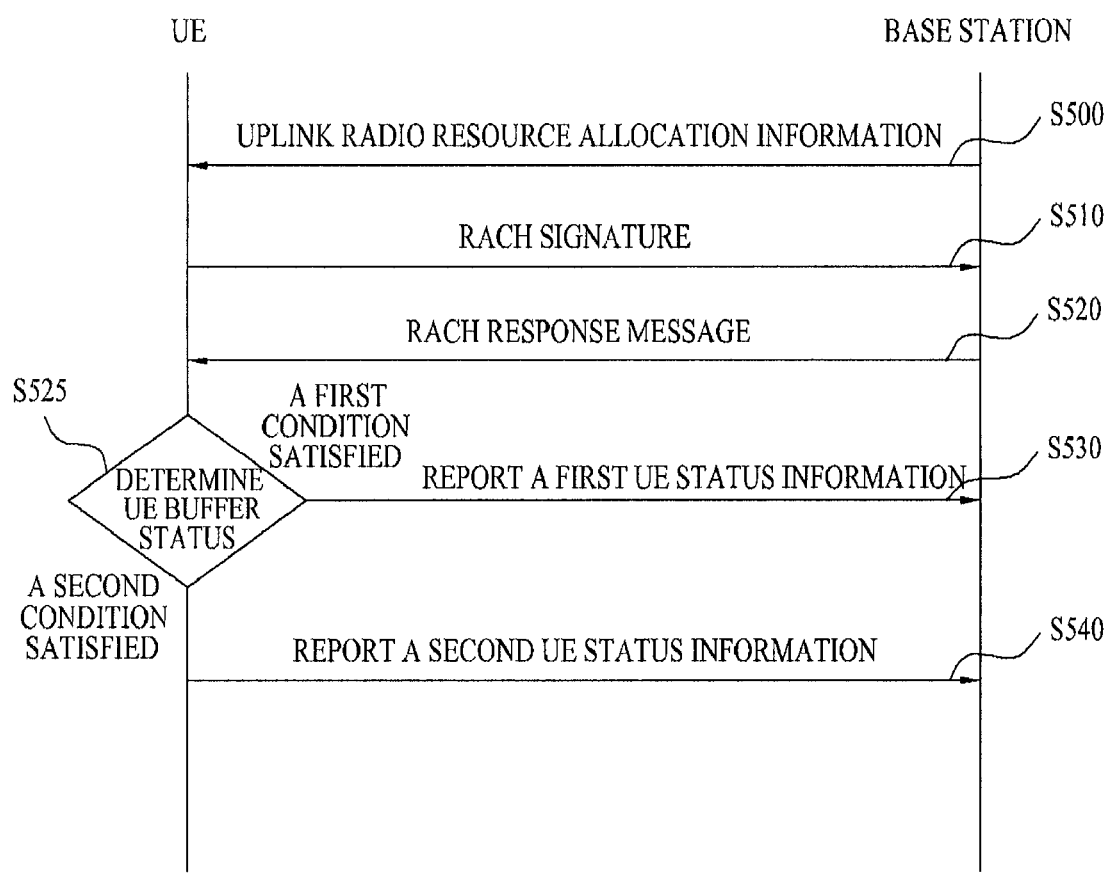
FIG. 5 is a flow chart illustrating a method for establishing/releasing a physical channel according to another embodiment of the present invention.

FIG. 5 is a flow chart illustrating a method for establishing/releasing a physical channel according to another embodiment of the present invention. In more detail, FIG. 5 shows a scheduling method using a random access channel (RACH) according to the inventive UE status report method.

Generally, the uplink channel of the UE, through which the UE transmits control information or user traffic information to the base station, may be a RACH for transmitting control information at the beginning of a call setup or a UL-SCH for transmitting user traffic data or control information after the call setup has been established. The RACH is mainly used to transmit control information at the beginning of the call setup. But, after the call setup has been established, the RACH may also be used to transmit control information to the base station. FIG. 5 shows a method for requesting the scheduling via the RACH, differently from the embodiment of FIG. 4 in which the UE has used the physical scheduling request channel as the dedicated physical channel so as to request the scheduling to the base station.

Generally, the UE acquires available RACH signature information or RACH occasion information from system information received from the base station. Thereafter, if the UE has data to be transmitted in uplink in its own buffer, it selects the RACH signature and the RACH occasion and transmits a random access preamble for requesting allocation of uplink resources to the base station. Thereafter, the base station transmits random access response information to the UE. This random access response information includes a UE identifier (also called a user identity), a time advance (TA), allocation information of radio resources for uplink transmission, etc.

The UE can transmit user traffic or the like to the base station using the above-mentioned radio resource allocation information for uplink transmission. Based on the above-mentioned operations, the embodiment of FIG. 5 will hereinafter be described in detail.

Referring to FIG. 5, the base station transmits uplink radio-resource allocation information to the UE at step S500. This uplink radio-resource allocation information can be periodically transmitted to the UE. The uplink radio-resource allocation information may include allocation information of a dedicated RACH signature, or may include information of a time slot capable of using this dedicated RACH signature. In this case, it should be noted that the above-mentioned uplink radio-resource allocation information includes radio-resource allocation information for reporting the UE's buffer status.

As described above, the base station can determine whether uplink resources are allocated to the UE using the UE buffer status information, and/or can determine the amount of allocated resources. In accordance with the embodiment of FIG. 5, in order to report the UE buffer status to the base station, the UE pre-negotiates with the base station about a specific condition of a UE buffer status, and reports the UE buffer status to the base station only when this specific condition is satisfied. There are two kinds of the specific condition of the UE buffer status pre-negotiated with the base station, i.e., a first condition associated with the configuration of the dedicated physical channel and a second condition associated with the release of the dedicated physical channel.

In an example of the first condition, if the UE-buffer size (i.e. the amount of data stored in UE buffer) is 0 or is less than a specific threshold value, or if voice data in a voice communication such as a VoIP is temporarily stopped (e.g., transition from talk spurt to silence period), the first condition can be satisfied.

In an example of the second condition, if the UE-buffer size (i.e. the amount of data stored in UE buffer) is not equal to 0 or is greater than a specific threshold value, or if voice data temporarily stopped in a voice communication such as a VoIP is retransmitted (e.g., transition from silence period to talk spurt), the second condition can be satisfied. The above-mentioned threshold value may be transmitted from the base station to the UE through the RRC or MAC message.

The embodiment of FIG. 5 uses the RACH based on the dedicated preamble of the UE without using the dedicated physical channel (i.e., the physical scheduling request channel), such that the UE requests the scheduling to the base station, differently from the embodiment of FIG. 4.

If data to be transmitted in uplink by the UE exists or the buffer of the UE has data to be transmitted, the UE transmits a dedicated RACH signature (i.e., RACH preamble) to the base station at a timeslot recognized at step S500, at step S510. If the base station receives the above dedicated RACH signature at the above timeslot, it determines that the UE has transmitted the scheduling request.

Thereafter, the base station transmits UE identification information such as a C-RNTI (Cell Radio Network Temporary Identity) for uplink resource allocation to the UE through the L1/L2 control channel (e.g., RACH response message) at step S520, such that the UE is able to use the above uplink resources. If the UE receives the above UE identification information from the base station, it can transmit the UE buffer status information to the base station using the allocated uplink resources. The UE determines its own buffer status information. If a specific condition is satisfied, the UE transmits a specific message to the base station. Associated detailed description will hereinafter be described in detail.

If the UE buffer status satisfies the first condition, the UE transmits the UE buffer status information to the base station using the allocated uplink resources of the above step S520, at step S530. This operation is called a first UE buffer status report. The UE can transmit the first UE buffer status report using the HARQ retransmission scheme. If the UE receives a positive acknowledgement message indicating the reception of the first UE buffer status report from the base station, the UE implicitly establishes uplink resources for transmitting the dedicated RACH signature. This implicit establishment is as follows. According to the implicit establishment, if data to be transmitted in uplink exists or data is stored in the UE buffer, uplink resources acquired at the above step S500 are continuously used as the uplink resources of the UE.

If the UE buffer status satisfies the second condition, it transmits the UE buffer status information to the base station using the allocated uplink resources of the above step S520 at step S540. This operation is called a second UE buffer status report. The UE can transmit the second UE buffer status report using the HARQ retransmission scheme. Upon receiving a positive acknowledgement message indicating the reception of the second UE buffer status report from the base station, the UE implicitly releases uplink resources for transmitting the dedicated RACH signature. Also, the base station implicitly releases uplink resources for the dedicated RACH signature.

This implicit release means that uplink resources allocated for data transmission to the uplink are released. Thereafter, the UE is unable to transmit the RACH signature in order to request the scheduling to the base station. In order to request the above scheduling, the UE may transmit the MAC PDU including the scheduling request information to the base station.

For the convenience of description and better understanding of the present invention, the above-mentioned embodiments have mainly disclosed a communication execution process between the transmission end and the reception end, but it should be noted that the transmission end may be a user equipment (UE) or a base station of the network, and the reception end may be an eNode-B or UE of the network. The terms disclosed in the present invention may be replaced with other terms having the same meanings. For example, the user equipment (UE) may be replaced with a mobile station (MS), a mobile subscriber station (MSS), a communication terminal, a user terminal as necessary. The term "base station" may also be replaced with a fixed station, Node-B (NB), an eNode-B, or eNB as necessary.

If required, individual constituent components or characteristics may be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that claims having no explicit citation relationships are combined with each other to implement the embodiments, or new claims obtained by the amendment after the patent application may also be contained in the present invention without departing from the scope and spirit of the present invention.

The above-mentioned embodiments of the present invention can be implemented by hardware, firmware, software, or a combination of them. In the case of implementing the present invention by hardware, one embodiment of the present invention can be implemented with ASICs (application specific integrated circuit), DSPs (digital signal processors), DSPDs (digital signal processing devices), PLDs (programmable logic devices), FPGAs (field programmable gate arrays), a processor, a controller, a microcontroller, and a microprocessor.

If operations or functions of the present invention are implemented by firmware or software, the present invention can be implemented in the form of a variety of formats, for example, modules, procedures, and functions, etc. The software codes may be stored in a memory unit so that it can be driven by a process. The memory unit is located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can be applied to a wireless mobile communication system. More specifically, the present invention can be applied to a multi-carrier wireless mobile communication system.

What is claimed is:

1. A method of establishing a dedicated physical channel of a user equipment (UE) by the UE in a wireless communication system comprising:
   receiving channel configuration information which is required for establishing the dedicated physical channel from a network, wherein the channel configuration information includes resource allocation information for reporting buffer status of the user equipment (UE);
   transmitting a first buffer status report to the network by using the resource allocation information if at least one first condition is satisfied, wherein the first buffer status report indicates that the user equipment (UE) establishes the dedicated physical channel;
   establishing the dedicated physical channel using the channel configuration information after transmitting the first buffer status report;

transmitting a scheduling request via the dedicated physical channel to the network;

receiving scheduling allocation information from the network;

transmitting a second buffer status report to the network by using the resource allocation information if at least one second condition is satisfied, wherein the second buffer status report indicates that the user equipment (UE) releases the dedicated physical channel; and releasing the dedicated physical channel after transmitting the second buffer status report.

2. A method of controlling configuration of a dedicated physical channel of a user equipment (UE) by a network in a wireless communication system comprising:

transmitting channel configuration information which is required for establishing the dedicated physical channel to a user equipment (UE), wherein the channel configuration information includes resource allocation information for reporting buffer status of the user equipment (UE);

receiving a first buffer status report indicating that at least one first condition is satisfied from the user equipment (UE) by using the resource allocation information, wherein the first buffer status report indicates that the user equipment (UE) establishes the dedicated physical channel;

receiving a scheduling request transmitted from the user equipment (UE) via the established dedicated physical channel, which is established using the channel configuration information;

transmitting scheduling allocation information to the user equipment (UE);

receiving a second buffer status report indicating that at least one second condition is satisfied from the user equipment (UE) by using the resource allocation information; and stopping reception of the dedicated physical channel after receiving the second buffer status report.

3. The method according to claim 1, wherein the dedicated channel is periodically allocated.

4. The method according to claim 1, wherein the at least one first condition and the at least one second condition are received from the network.

5. The method according to claim 1, wherein the at least one first condition is satisfied when an amount of data stored in a buffer of the user equipment (UE) is less than a first threshold value.

6. The method according to claim 1, wherein the at least one second condition is satisfied when an amount of data stored in a buffer of the user equipment (UE) is greater than a second threshold value.

7. The method according to claim 1, wherein the at least one first condition is satisfied when a talk or communication period is shifted to a silence period in a voice communication.

8. The method according to claim 2, wherein the dedicated physical channel is periodically allocated.

9. The method according to claim 2, wherein the at least one first condition is satisfied when an amount of data stored in a buffer of the user equipment (UE) is less than a first threshold value.

10. The method according to claim 2, wherein the at least one second condition is satisfied when an amount of data stored in a buffer of the user equipment (UE) is greater than a second threshold value.

11. The method according to claim 2, wherein the at least one first condition is satisfied when a talk or communication period is shifted to a silence period in a voice communication.

12. The method according to claim 7, wherein the at least one second condition is satisfied when the silence period is shifted to the talk or communication period in the voice communication.

13. The method according to claim 7, wherein the first buffer status report and the second buffer status report include information associated with a mode shift.

14. The method according to claim 7, wherein the first buffer status report and the second buffer status report are transmitted to the network according to a hybrid automatic repeat request (HARQ) scheme.

15. The method according to claim 11, wherein the at least one second condition is satisfied when the silence period is shifted to the talk or communication period in the voice communication.

16. The method according to claim 11, wherein the first buffer status report and the second buffer status report include information associated with a mode shift.

17. The method according to claim 11, wherein the first buffer status report and the second buffer status report are transmitted to the network according to a hybrid automatic repeat request (HARQ) scheme.

* * * * *